Feb. 11, 1969  W. B. CONRAD  3,426,613
MOTION TRANSMITTING REMOTE CONTROL ASSEMBLY
Filed May 2, 1966
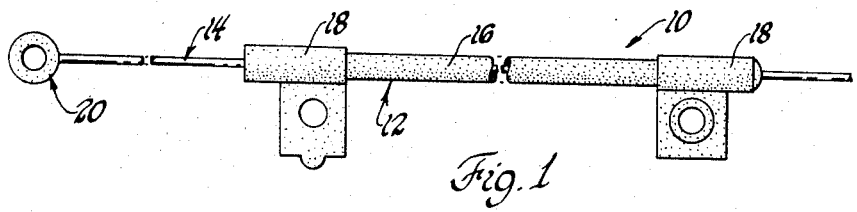
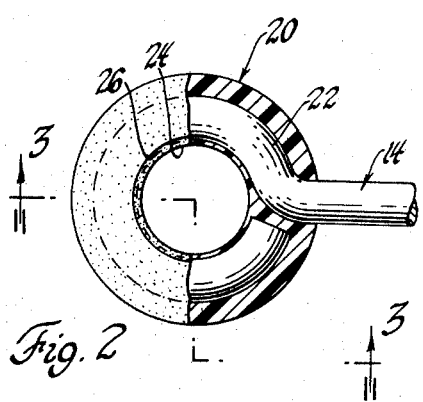
Fig. 2
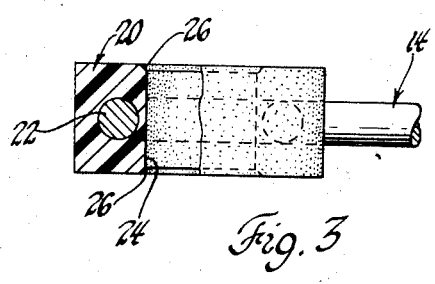
Fig. 3
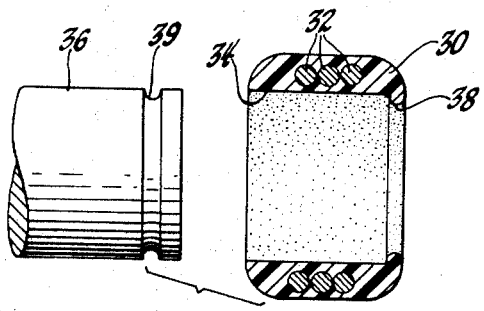
Fig. 4
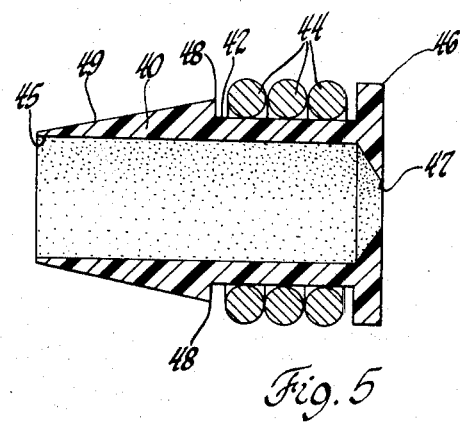
Fig. 5
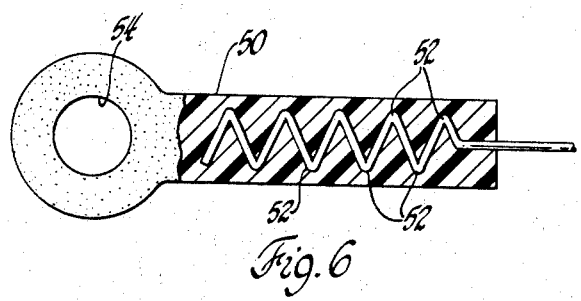
Fig. 6
INVENTOR.
Winthrop B. Conrad
BY
Barnard, McEwyn & Leising
ATTORNEYS

United States Patent Office 3,426,613
Patented Feb. 11, 1969

3,426,613
MOTION TRANSMITTING REMOTE
CONTROL ASSEMBLY
Winthrop B. Conrad, Franklin, Mich., assignor to Teleflex Incorporated, North Wales, Pa., a corporation of Delaware
Filed May 2, 1966, Ser. No. 546,900
U.S. Cl. 74—501   12 Claims
Int. Cl. F16c 1/12; F16f 1/38; B29f 1/10

ABSTRACT OF THE DISCLOSURE

A motion transmitting remote control assembly including a flexible conduit with fittings of organic polymeric material secured thereto for attaching the conduit to a support structure and a wire-like motion transmitting core element movably supported by the conduit and extending therefrom with at least one loop in the end thereof and a terminal means of organic polymeric material in mechanical interlocking engagement with the loop, the terminal means being adapted by a hole therethrough to be connected to a control member.

---

This invention relates to a motion transmitting remote control assembly which is normally manually operated to control a device by transmitting tension or compression in a curved path by means of a flexible motion transmitting core element and, more specifically, to an improved terminal means for the ends of such core elements.

Motion transmitting remote control assemblies of the type to which the instant invention pertains usually include a guide comprising a conduit with fittings disposed adjacent each end for attaching the conduit to a support structure, and a motion transmitting core element, which is frequently a wire-like member, movably disposed in the conduit with the ends extending from each end of the conduit. One end of the core element is usually adapted to be manually moved and the other end is adapted to be attached to a control member of a device to be controlled. The heretofore typical manner in which the core element is attached to the control member is by shaping the end of the wire-like core element into one or more loops so that the control member is disposed in the hole formed by the loop.

Such remote control assemblies are utilized in land vehicles, airplanes and marine craft. Typical of the use of such remote control assemblies is the utilization in automobiles to control remotely disposed valves in the heating, cooling and ventilating systems from an area adjacent the instrument panel. Frequently, the devices controlled by such remote control assemblies are very sensitive to movement of the core element. However, the tolerances of the hole defined by the loop formed in the end of the core element are such that lost motion occurs between the core element and the control member disposed in the hole in the loop when the core element is moved, which lost motion is unsatisfactory when such remote control assemblies are utilized to control sensitive devices. In addition, the "pull-off strength," i.e., the force applied to the core element which is sufficient to bend that portion of the wire-like core element forming the loop to remove the loop and disengage the core element from the member being controlled, is determined by the gauge of the wire utilized to form the core element and it is frequently necessary that the pull-off strength be higher than that provided by the gauge of wire normally utilized and in order to acquire such pull-off strength, an unsuitably large gauge of wire must be utilized.

Accordingly, it is an object and feature of this invention to provide a motion transmitting remote control assembly including a guide movably supporting a motion transmitting core element with a terminal means of organic polymeric material in mechanical interlocking engagement with at least one end of the core element and adapted to be attached to a member to be controlled, thus providing a terminal means having tolerances which are very accurately controlled during the molding step.

Another object and feature of this invention is to provide a motion transmitting remote control assembly including a guide for movably supporting a motion transmitting core element with a terminal means of organic polymeric material in mechanical interlocking engagement with at least one end of the core element and adapted for attachment to a member to be controlled, thus greatly increasing the force necessary to pull the core element from the member to be controlled.

In general, these and other objects and features of this invention may be attained in a preferred embodiment wherein the motion transmitting remote control assembly includes a guide comprising a conduit with fittings secured to the conduit for attaching the conduit to a support structure and a motion transmitting core element movably supported within the conduit. The motion transmitting core element is preferably formed of a wire-like element having an irregularly shaped portion at at least one end. A terminal means of organic polymeric material is disposed in mechanical interlocking engagement with the irregularly shaped portion of the core element and is adapted for attachment to a control member. In one embodiment of the invention, the irregularly shaped portion at the end of the core element takes the form of at least one loop, and the terminal means is molded about the loop and defines a hole passing through the loop for receiving the control member. In another embodiment, the terminal means of organic polymeric material is molded separately with a recess extending circumferentially thereabout and is inserted through the loop so that the loop is disposed in the recess whereby the terminal means is in mechanical interlocking engagement with the core element, the terminal means being formed with a hole therethrough for receiving the control member. In yet another embodiment of the invention, the irregularly shaped portion of the core element comprises a series of reverse bends and the terminal means of organic polymeric material is molded about the series of reverse bends so as to be in mechanical interlocking engagement with the core element.

Other objects and attendant advantages of the present invention will be readily appreciated as the same becomes better understood by reference to the following detailed description when considered in connection with the accompanying drawings wherein:

FIGURE 1 is a view of a preferred embodiment of the motion transmitting remote control assembly of the instant invention;

FIGURE 2 is an enlarged fragmentary and partially broken away view of the embodiment of the terminal means shown in FIGURE 1;

FIGURE 3 is a fragmentary cross-sectional view taken substantially along line 3—3 of FIGURE 2;

FIGURE 4 is an enlarged fragmentary cross-sectional view of another preferred embodiment of the terminal means for the motion transmitting core element of the instant invention;

FIGURE 5 is an enlarged cross-sectional view of another preferred embodiment of the terminal means for the motion transmitting core element of the instant invention; and FIGURE 6 is an enlarged fragmentary partially broken away view of another preferred embodiment of the terminal means for the motion transmitting core element of the instant invention.

Referring now to the drawings, wherein like numerals indicate like or corresponding parts throughout the several views, a preferred embodiment of the motion transmitting remote control assembly of the instant invention is generally shown at 10 in FIGURE 1. The motion transmitting remote control assembly 10 includes a guide, generally indicated at 12, and a motion transmitting core element, generally indicated at 14.

The guide 12 includes a conduit 16 which has a bore extending therethrough and which bore is preferably defined by a surface of organic polymeric material. The motion transmitting core element 14 is movably disposed in the bore of the conduit 16. The guide 12 also includes means comprising the fittings 18 for attaching the conduit 16 to a support structure. Preferably, the outer surface of the conduit 16 is also of an organic polymeric material and the fittings 18 are made of organic polymeric material and molded about the conduit 16.

A terminal means of organic polymeric material and in mechanical interlocking engagement with one end of the core element 14 for attaching the core element to a control member and is generally indicated at 20. The other end of the core element (not shown) is normally adapted to be manually controlled but may also utilize a terminal means 20. Thus, the control member to which the terminal means 20 is attached may be an input member or an output member. The terminal means 20 is best shown in FIGURES 2 and 3 and is molded about a non-uniformly or irregularly shaped portion of the core element 14 which is defined or formed by at least one loop 22. Hence, the terminal means 20 is molded into mechanical interlocking engagement with the loop 22. The organic polymeric terminal means 20 is molded about the loop 22 so as to include a hole 24 passing therethrough for receiving a control member. The terminal means 20 also include an outwardly flared portion 26 at each end of the hole 24 for facilitating the positioning of the terminal means 20 on a control member.

The terminal means 20 may be formed of various organic polymeric materials such as polyethylene, polypropylene or an acetal resin. As alluded to previously, the tolerances of the diameter of the hole formed by the loop 22 in the prior art core elements frequently allow lost motion between the core element and the control member. Generally, the tolerances of the diameter formed by the loop in the prior art core elements is plus or minus .005 inch; thus, when such a core element has a loop disposed at each end, there frequently occurs a lost motion of .0010 inch due to the accumulated lost motion at the two respective ends of the core element. However, by molding the terminal means 20 of organic polymeric material about the loop 22, the diameter of the hole 24 formed by the terminal means can be very accurately controlled in the molding process. For example, the tolerance of the diameter of the hole 24 can be easily controlled to plus or minus .001 of an inch, thus reducing the lost motion prevalent in the prior art assemblies. Furthermore, the organic polymeric material of the terminal means 20 forms a low friction surface defining the hole 24 which facilitates smoother operation of the assembly.

In addition, it has been found that a prior art core element having a loop 22 without the terminal means 20 thereabout has a pull-off strength of about thirty-five pounds; which is to say, that a prior art core element of a particular gauge wire may be pulled from the element to be controlled by removing the loop 22 upon the application of thirty-five pounds of force. However, by utilizing the same gauge wire and molding a terminal means 20 of an acetal resin about the loop, the pull-off strength is increased to a value of approximately one-hundred and sixty pounds force. This is a very significant advance in the art since a wire of reduced gauge may be utilized for the core element because the addition of the terminal means 20 greatly increases the pull-off strength. Or, to state it another way, the pull-off strength of prior art core elements of a particular gauge wire is greatly increased by utilizing the organic polymeric terminal means 20.

The terminal means 30 shown in FIGURE 4 is molded about a plurality of loops 32 formed in the end of a motion transmitting core element. The terminal means 30 includes a hole 34 passing therethrough for receiving a control member 36. The terminal means 30 includes a rib 38 which is molded integrally with the terminal means 30 and is disposed within and about the circumference of the hole 34 whereby the terminal means 30 may be disposed on the control member 36 which will extend through the hole 34 and includes a groove 39 for receiving the rib 38 to retain the terminal means 30 on the control member 36. Thus, by utilizing the rib 38 which coacts with the groove 39 in the control member 36, the need for additional means secured on the end of the member 36 to retain the terminal means 30 on the member 36 is eliminated. Although not shown, it will be understood that a rib, similar to rib 38, also may be disposed in the hole 24 of the terminal means 20.

Another preferred embodiment of the terminal means is indicated at 40 in FIGURE 5. The organic polymeric terminal means 40 includes a recess 42 which is disposed circumferentially thereabout. The terminal means 40 is disposed within the loops 44 of the core element so that the loops 44 are disposed in the recess 42 to form the mechanical interlocking engagement between the core element and the terminal means 40. The terminal means 40 includes a flange 46 adjacent one extremity of the recess 42 and a raised portion 48 adjacent the other extremity of the recess 42. The terminal means 40 is inwardly tapered at 49 from the raised portion 48 in a direction away from the recess 42 and toward the end of the terminal means 40 for facilitating the insertion of the terminal means 40 into the loops 44. That is, the organic polymeric material of which the terminal means 40 is molded is sufficiently flexible to allow the terminal means 40 to be inserted through the loops 44. The terminal means 40 also includes a hole 45 with a rib 47 disposed about the circumference of the hole 45 for being disposed in a groove of a control member extending into the hole 45 in a manner similar to that illustrated and described in connection with FIGURE 4.

FIGURE 6 discloses another preferred embodiment of the terminal means which is indicated at 50. In the embodiment illustrated in FIGURE 6, the irregularly shaped portion of the core element is formed by a series of reverse bends 52 and the organic polymeric terminal means 50 is molded about the bends 52 to form the mechanical interlocking engagement between the core element and the terminal means 50. The terminal means 50 also includes a hole 54 therethrough for receiving a control member, and it will be understood that a rib similar to the ribs 38 and 47 shown in FIGURES 4 and 5 respectively may be utilized in the hole 54 of the terminal means 50.

It will be understood that the rib disposed in the hole of any one of the embodiments illustrated may be disposed midway through the hole in the terminal means and the respective terminal means may, in addition, have flared portions similar to the outwardly flared portions 26 illustrated in FIGURE 3.

The manner in which the embodiments illustrated in FIGURES 1 through 5 are manufactured differs from that in which the embodiments of FIGURE 6 is manufactured because in the embodiments illustrated in FIGURES 1 through 5 the core element has at least one end shaped so as to form at least one loop whereas the core element in the embodiment of FIGURE 6 has one end shaped to form a series of reverse bends. In all of the embodiment illustrated in FIGURE 5 differs from the locking engagement with the core element; however, the embodiment illustrated in FIGURE 5 differs rfom the others because the terminal means 40 is molded separately with the recess disposed circumferentially thereabout and is thereafter inserted into the loop or loops formed at the end of the core element to provide the mechanical interlocking engagement between the terminal means and the core element, whereas the terminal means in the other embodiments is molded in situ about the irregularly shaped portion of the core element to attain the mechanical interlocking engagement. It will be understood that although the core element 14 has been described and illustrated as a wire-like member, other configurations may be utilized to equal advantage.

The embodiments of the invention in which an exclusive property or privilege is claimed are defined as follows:

1. A motion transmitting remote control assembly comprising: a guide, a motion transmitting core element movably supported by said guide, said core element including at least one loop, terminal means of organic polymeric material in mechanical interlocking engagement with said loop of said core element, said terminal means being molded about said loop and including a hole passing therethrough for receiving a control member, and a rib molded integrally with said terminal means and disposed within and at least partially about the circumference of said hole whereby said terminal means may be disposed on a control member which extends through said hole and includes a groove for receiving said rib to retain said terminal means on the control member.

2. A motion transmitting remote control assembly comprising: a guide, a motion transmitting core element movably supported by said guide, said core element including at least one loop, terminal means of organic polymeric material in mechanical interlocking engagement with said loop of said core element, said terminal means being adapted for connection to a control member, said organic polymeric terminal means including a recess disposed circumferentially thereabout, said terminal means being disposed within said loop so that said loop is disposed in said recess to form said mechanical interlocking engagement between said core element and said terminal means.

3. A motion transmitting remote control assembly as set forth in claim 2 wherein said terminal means includes a flange adjacent one extremity of said recess and a raised portion adjacent the other extremity of said recess, said terminal means being inwardly tapered from said raised portion in a direction away from said recess for facilitating insertion of said terminal means into said loop.

4. A motion transmitting remote control assembly as set forth in claim 3 wherein said terminal means includes a hole therethrough and a rib disposed within and at least partially about the circumference of said hole whereby said terminal means may be disposed on a control member which extends through said hole and includes a groove for receiving said rib to retain said terminal means on the control member.

5. A motion transmitting remote control assembly as set forth in claim 3 wherein said guide includes a conduit with a bore therethrough, which bore has a surface of organic polymeric material for movably supporting said core element, and means for attaching said conduit to a support structure, said core element comprising a wire.

6. A motion transmitting remote control assembly comprising: a guide, a motion transmitting core element movably supported by said guide, said core element including a series of reverse bends, terminal means of organic polymeric material molded about said bends so as to be in mechanical interlocking engagement with said core element, said terminal means including a hole therethrough for receiving a control member, a rib disposed within and at least partially about the circumference of said hole whereby said terminal means may be disposed on a control member which extends through said hole and includes a groove for receiving said rib to retain said terminal means on the control member.

7. In a method of manufacturing a motion transmitting remote control assembly of the type comprising a guide and a motion transmitting core element movably supported in said guide, the improvement including shaping the core element into at least one loop, and molding an organic polymeric terminal means about said loop with a hole therethrough which extends through said loop for receiving a control member so that said terminal means is in mechanical interlocking engagement with said loop.

8. In a method of manufacturing a motion transmitting remote control assembly of the type comprising a guide and a motion transmitting core element movably supported in said guide, the improvement including shaping the core element into at least one loop, molding an organic polymeric terminal means with a recess disposed circumferentially thereabout and inserting said terminal means into said loop so that said loop is disposed in said recess and in mechanical interlocking engagement with said terminal means.

9. A motion transmitting remote control assembly comprising; a guide, a motion transmitting core element movably supported by said guide, said core element including at least one loop, terminal means of organic polymeric material in mechanical interlocking engagement with said loop thereby preventing movement thereof relative to said core element along the longitudinal axis thereof, said terminal means including a hole extending through said loop for receiving a control member.

10. A motion transmitting remote control assembly as set forth in claim 9 wherein said terminal means is molded about said loop.

11. A motion transmitting remote control assembly as set forth in claim 9 wherein said terminal means includes an outwardly flared portion at each end of said hole therethrough.

12. A motion transmitting remote control assembly as set forth in claim 9 wherein said guide includes a conduit with a bore therethrough, which bore has a surface of organic polymeric material for movably supporting said core element, and means for attaching said conduit to a support structure, said core element comprising a wire.

References Cited

UNITED STATES PATENTS

| | | | |
|---|---|---|---|
| 1,918,792 | 7/1933 | Arens | 74—502 |
| 2,132,919 | 10/1938 | Arens | 74—502 |
| 3,373,632 | 3/1968 | Jeromson et al. | 74—502 |
| 1,983,267 | 12/1934 | Browne et al. | 264—249 |
| 2,312,516 | 3/1943 | Alldredge | 287—85 |
| 3,233,928 | 2/1966 | Peickii et al. | 287—85 |
| 3,263,520 | 8/1966 | Tschanz | 74—501 |
| 3,298,243 | 1/1967 | Geissler et al. | 74—501 |

MILTON KAUFMAN, *Primary Examiner.*

U.S. Cl. X.R.

29—453, 527; 264—249, 271; 287—85